Sept. 3, 1935.  A. H. R. FEDDEN  2,013,381
COUPLING FOR SPARKING PLUGS
Filed Sept. 17, 1934   4 Sheets-Sheet 1

Inventor
Alfred H. R. Fedden
by Wilkinson & Mawhinney
Attorneys.

Sept. 3, 1935. A. H. R. FEDDEN 2,013,381
COUPLING FOR SPARKING PLUGS
Filed Sept. 17, 1934 4 Sheets-Sheet 2

Inventor
Alfred H.R. Fedden
by Wilkinson & Mawhinney
Attorneys.

Sept. 3, 1935. A. H. R. FEDDEN 2,013,381
COUPLING FOR SPARKING PLUGS
Filed Sept. 17, 1934 4 Sheets-Sheet 3
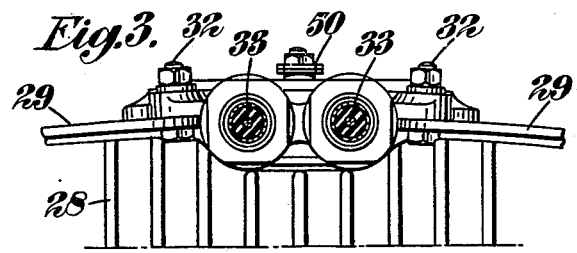
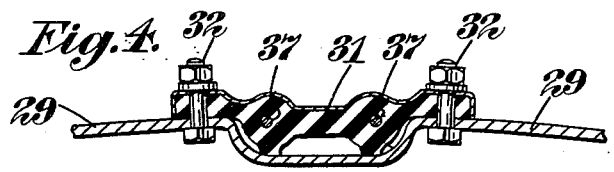
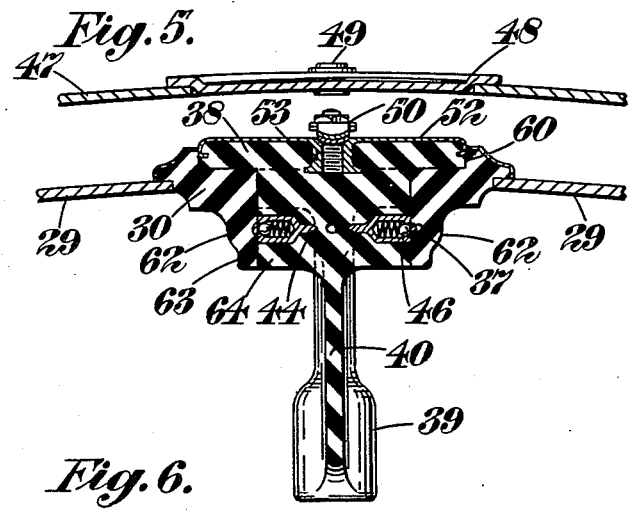
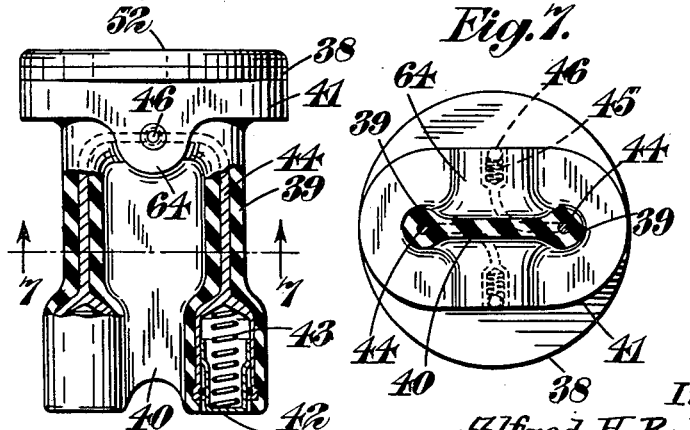
Inventor
Alfred H. R. Fedden
by Wilkinson & Mawhinney
Attorneys.

Sept. 3, 1935.　　　A. H. R. FEDDEN　　　2,013,381
COUPLING FOR SPARKING PLUGS
Filed Sept. 17, 1934　　　4 Sheets-Sheet 4

Inventor
Alfred H. R. Fedden
by Wilkinson & Mawhinney
Attorneys.

Patented Sept. 3, 1935

2,013,381

UNITED STATES PATENT OFFICE 2,013,381

COUPLING FOR SPARKING PLUGS

Alfred Hubert Roy Fedden, Bristol, England, assignor to The Bristol Aeroplane Company Limited, Bristol, England, a British company Application September 17, 1934, Serial No. 744,447
In Great Britain December 16, 1933

15 Claims. (Cl. 123—143)

This invention is for improvements in or relating to electric coupling means for the sparking plugs of internal-combustion engines, such as sleeve-valve engines, in which the sparking plug is situated in a recess. In a sleeve-valve engine the cylinder-head has a central recess formed by the cylindrical sleeve-guiding walls which extend outwardly beyond the combustion chamber. The sparking plug (or plugs) is situated in the combustion-head at the bottom of this recess, and is therefore somewhat difficult of access.

The object of the present invention is to facilitate the operation of electrically connecting the high-tension leads to, and electrically detaching them from, sparking plugs so situated.

According to the invention, the coupling between the high-tension cable and the sparking plug electrode comprises a portion fixed to the cylinder-head and to which the cable is connected, and a contact-carrying portion interengaging with the fixed portion and providing a bridging connection between the cable and the plug electrode, said contact-carrying portion being removable out of the recess to render the sparking plug accessible. According to another feature of the invention, a waterproof and insulating sheath is provided to extend from the insulation of the sparking-plug electrode to the adjacent end of the contact-carrier, whereby the electrode and the co-operating contact are completely enclosed within a watertight chamber. Means may also be provided for enclosing in a watertight chamber the contact between the contact-carrying portion of the coupling and the fixed portion aforesaid.

Other features of the invention will be described hereinafter.

Figure 1:
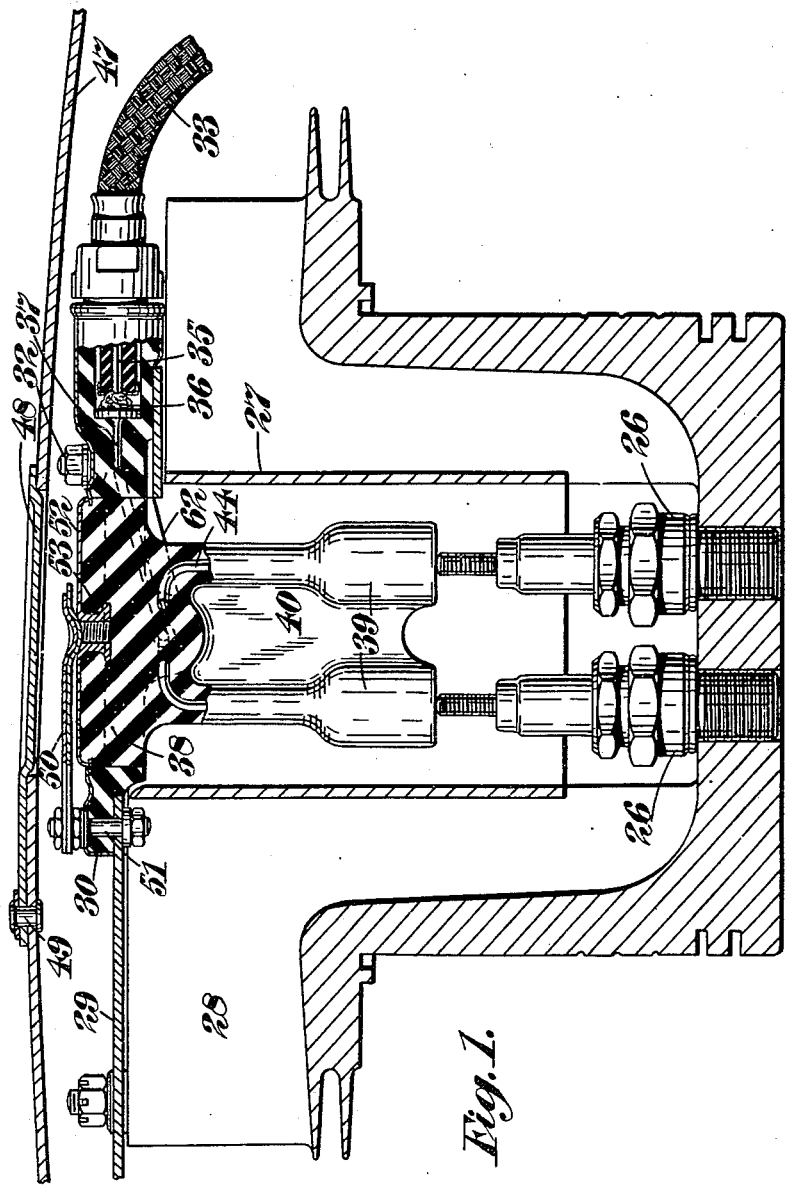
Figure 2:
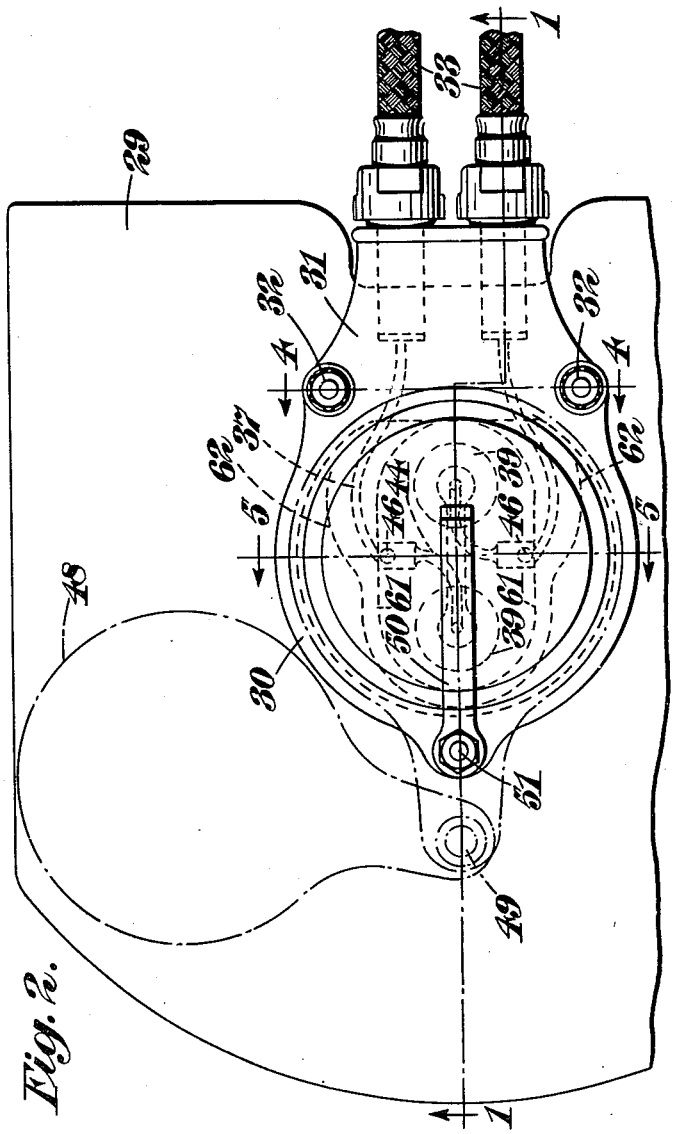
Figure 8:
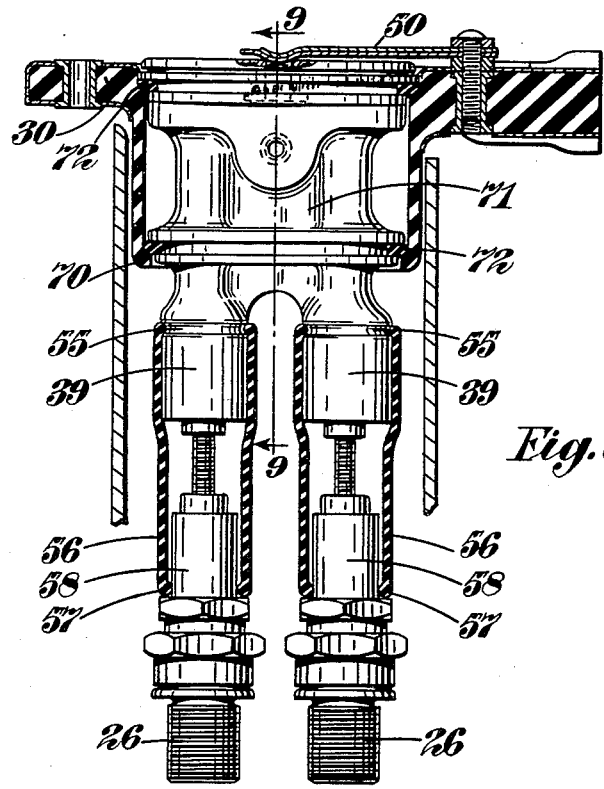
Figure 9:
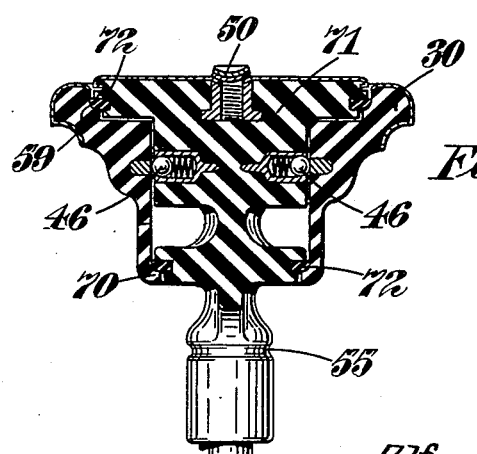

Specific embodiments of the present invention, as applied to a sleeve-valve air-cooled internal-combustion engine for aircraft, will now be described, with reference to the accompanying drawings, of which Figure 1 is an elevation, being a section on the line 1—1 of Figure 2, of one form of coupling according to the invention, showing the cylinder-head and associated parts, Figure 2 is a plan corresponding to Figure 1, Figure 3 is an elevation at right-angles to Figure 1, Figure 4 is a sectional elevation on the line 4—4 of Figure 2, Figure 5 is an elevation on the line 5—5 of Figure 2, Figure 6 is a view of the plug portion of the coupling alone, whilst Figure 7 is a sectional under-plan on the line 7—7 of Figure 6, Figure 8 is a sectional elevation of another form of coupling according to the invention, whilst Figure 9 is a sectional elevation on the line 9—9 of Figure 8, with certain parts omitted.

As shown first in Figures 1 to 7, a sleeve-valve cylinder-head 25 is fitted with two sparking plugs 26 screwed into the combustion chamber in the usual manner. Inside the cylinder-head 25 is a curved partition 27 which, as described in United States Patent No. 1,962,987 divides the cylinder-head recess into an inner and outer compartment. A blast of air for cooling the recess is caused to pass through the outer compartment by the motion of the aircraft through the air and is guided by upstanding vanes or partitions 28 (see Figure 3) and by a cover-plate 29 which surmounts the cylinder-head and the vanes 28.

The plate 29 has a central aperture to accommodate a moulding of synthetic resin, having a circular part 30 and a lug portion 31, the lug being accommodated in a gap in the plate 29. The moulding is affixed to the plate 29 by bolts 32.

The shape and construction of the moulding 30 will be understood from Figures 1, 2, 4 and 5. The high-tension cables 33 are connected to the lug portion by suitable nuts and glands to engage the metal braiding on the cables and the core 35 of each cable makes contact with a conductor 36 to which is connected a lead 37 embedded in the moulding and passing, as shown in Figures 2 and 5, to a point in the longer wall of an oblong opening in the ring 30.

The shape of the moulded ring 30 may be understood by comparing Figures 1, 2 and 5. At its uppermost section it is formed with a circular recess 60 to receive the plug portion of the coupling as described below. Below the circular recess there is an oblong hole shown by the dotted line 61 in Figure 2. The lower edges of the oblong hole slope downwardly as shown at 62 into depending lug portions 63, one on each of the longer sides of the oblong hole. The walls of the moulding are also thickened at 62 as shown in Figures 2 and 5.

The conducting leads are embedded in the thickened portions 62 of the moulding and emerge on the inner walls of the lugs 63.

The plug-portion of the coupling comprises another moulding of synthetic resin, having a head 38 with two downwardly-projecting limbs 39 interconnected by a web 40. The head 38 is circular, but immediately below the head an oblong portion 41 is formed which fits snugly in the oblong opening 61, above described, in the ring 30. The lower end of each limb is enlarged to accommodate a plunger 42 (see Figure 6) spring-pressed downwardly by a coil-spring 43, and the spring 43 makes contact with a conductor 44 embedded in the limb and passing upwardly and outwardly into a lug 64 in the moulding (see Figures 5 and 7) to make contact with a spring 45 engaging a ball 46. The lugs 64 on the plug-moulding register with the lug-portions 63 on the ring-moulding so that, as shown, the balls 46 make electrical contact with the exposed ends of the conductors 37.

Figure 1 shows one cylinder-head of a radial-cylinder air-cooled sleeve-valve aircraft engine of the kind which is surrounded by a cowl 47 of streamlined cross-section or contour and in order that the sparking-plug coupling may be accessible, in spite of the presence of this cowl, the cowl is cut with a circular aperture and provided with a plate 48 which normally closes the aperture but is hinged to a rivet 49, so that the plate may be prised out of its seat and rotated on the rivet 49 into the position shown in broken lines in Figure 2, whereby the coupling becomes accessible through the cowl.

The plug-portion of the coupling is held in place by means of a resilient strip of metal 50 pivoted about a bolt 51 and engaging a depression in the middle of a cover-plate 52 which is moulded on to the outer surface of the plug-portion. When the spring 50 is moved to one side, a screw-threaded rod may be screwed into a bush 53 moulded in the plug, and the plug may thereby be withdrawn through the ring 30 and out of engagement with the sparking plugs. The ring 30 and its lug-portion 31 are normally permanently fixed to the cylinder so that it is not necessary for them to be accessible from outside the cowl 47.

In addition to the metal plate 52 which covers the plug-portion of the coupling, the ring 30 is also covered with metal both on its outer surface and on its curved walls, and it will be seen that when the coupling described above is completely assembled, the circuit for the ignition current is completely screened by metallic conductors, so that the firing of the engine cannot interfere with radio reception or transmission.

During working of the engine it is found that air laden with moisture passes into the recess in the cylinder-head and remains there when the engine is stopped; when the engine cools down the moisture condenses, and in some cases there is a risk that such moisture may provide a conducting path from the exposed contacts between the sparking plug and the coupling and from the contacts between the two parts of the coupling, to an earthed part of the assembly.

To remove the risk above described, the modified construction shown in Figures 8 and 9 may be used, in which the limbs of the plug-portion of the coupling are formed with peripheral grooves 55, each to receive the beaded end of an expanded rubber tube 56, the other end of which is also beaded at 57 and is adapted to slide on to the insulating portion 58 of the sparking plug 26.

The ring-portion 30 of the coupling is enlarged in a direction axial of the engine-cylinder and is provided with a step 59 near the top and another step 70 near the bottom. The plug-portion 71 of the coupling has corresponding steps formed on it, and, in addition, it is formed with two grooves, each receiving a rubber ring 72, each ring co-operating with one of the steps above referred to, to make a watertight seal.

The spring-pressed ball contacts 46, it will be seen, lie at a point between the two rubber rings 72.

Except for the difference stated, the construction shown in Figures 8 and 9 is identical with that described with reference to Figures 1 to 7. When the coupling is to be assembled, the rubber tubes 56 are slipped on to the limbs 39 of the plug-portion 71 of the coupling, their beaded ends engaging the peripheral grooves 55, and the plug-portion 71 is then passed down through the aperture in the ring-portion 30, with the result that each rubber tube 56 engages and slides over the insulating portion 58 of the appropriate sparking plug 26. The bead 57 at the lower end of each tube 56 grips the insulating portion 58 of the sparking plug sufficiently closely to make a water-tight seal at this point, and the result is that both the sparking plug electrode and the plunger contact 42 are enclosed in a water-tight chamber so that there is no possibility of condensation, should it occur, forming a conducting path between them and an earthed part of the assembly.

Similarly, with regard to the ball contacts 46, these lie in a sealed chamber constituted by the rubber rings 62 and the synthetic resin mouldings; the pressure of the spring 50 is sufficient to hold these rubber rings tightly against their seatings so that there is no possibility of short-circuiting of the ignition system due to the deposition of moisture.

I claim:

1. An electrical coupling, for a sparking plug situated in the recessed cylinder-head of an internal-combustion engine including a high tension ignition system and cable, comprising a portion fixed to the cylinder-head and to which the high-tension cable is permanently connected, and a contact-carrying portion engaging with the fixed portion and providing a bridging electrical connection between the cable and the sparking plug electrode, said contact-carrying portion being detachable from the fixed portion and removable out of the recess to render the sparking plug accessible.

2. A recessed cylinder-head for an internal-combustion engine including a high tension ignition system and cable comprising a sparking plug situated at the bottom of the recess, a socket of insulating material fixed to the cylinder-head at the top of the recess and through which the sparking plug is accessible, a contact-carrier of insulating material adapted to engage the socket member and to extend into the recess, a conductor carried by the socket portion and electrically connected to the core of the cable, a conductor carried by the contact-carrier and connected to an electrical contact which engages the sparking plug electrode when the contact-carrier is in position within the socket, and means for electrically connecting the conductor on the socket member to, and disconnecting it from, the conductor on the contact-carrier.

3. An insulated electrical coupling for the sparking plug of a sleeve-valve internal-combustion engine including a high tension ignition system and cable comprising a socket having a non-circular aperture to receive a contact-carrier within it, a contact on the contact-carrier to engage the sparking plug electrode, a conductor carried by the socket and electrically connected to the core of the cable, a separate conductor carried by the contact-carrier and connected to the said sparking plug electrode-contact, wherein the said conductors are arranged to make electrical contact with one another at the non-circular region of the said socket when the said contact-carrier is inserted in the socket, and to be disconnected from one another when the contact carrier is removed from the socket.

4. An electrical coupling for a sparking plug situated in the recessed cylinder-head of an internal-combustion engine including a high tension ignition system and cable, comprising a socket of insulating material fixed to the cylinder-head and having embedded within it a conductor to which the core of the high-tension cable is connected, a contact-carrying portion of insulating material engaging with the socket portion but detachable therefrom, a conductor embedded within the said contact-carrier and electrically connected to a resilient contact adapted to engage electrically with the electrode of the sparking plug, and means for connecting the conductor in the socket portion to the conductor in the contact-carrier when the contact-carrier is in position in the socket portion, and to disconnect it therefrom when the contact-carrier is removed from the socket portion.

5. An internal-combustion engine of the sleeve-valve type including a high tension ignition system and cable, having a sparking plug situated at the bottom of a recess in a cylinder-head, comprising a moulding of synthetic resin affixed to the cylinder-head at the top of the recess, a conductor embedded in the moulding and connected electrically both to the core of the cable and to an exposed conducting surface on the moulding, a contact-carrier also of moulded synthetic resin having a conductor embedded within it and connected both to a resilient contact adapted to engage electrically with the electrode of a sparking plug and to a separate and exposed conductor on the contact-carrier which registers with the exposed conductor on the fixed moulding when the contact-carrier is placed in its position in which the resilient contact engages the sparking plug electrode.

6. An electrical coupling, for a sparking plug situated in the recessed cylinder-head of an internal-combustion engine, comprising a socket portion fixed to the cylinder-head at the top of the recess, a contact-carrying portion adapted to engage the socket portion electrically and mechanically and thus to afford a bridging connection between the socket portion and the sparking plug and coverings of conducting material surmounting the socket portion and the contact-carrying portion whereby the electrical coupling is wholly electro-magnetically screened.

7. An electrical coupling for the sparking plug of an internal-combustion engine, of the kind in which the sparking plug is situated in the bottom of a recess in the cylinder-head and including a high tension ignition system and cable, comprising a rigid contact-carrier adapted to be connected at its upper end with the conducting cable and at is lower end with the sparking plug electrode, and an insulating and waterproof sheath extending from the insulation of the sparking plug electrode to the adjacent end of the contact-carrier.

8. An electrical coupling for the sparking plug of an internal-combustion engine having a recessed cylinder-head comprising a socket-shaped conductor-carrying portion fixed at the top of the recess, a detachable contact-carrying portion adapted to engage the socket and to connect its conductor electrically with the sparking plug electrode, and means for enclosing in a watertight chamber the electrical contact between the contact-carrying portion of the coupling and the socket portion thereof.

9. An electrical coupling as claimed in claim 8, wherein the said means is constituted by a pair of resilient packing rings between the socket portion and the contact-carrying portion spaced apart so as to enclose between them the region of the electrical contact between the two portions.

10. An electrical coupling, for a sparking plug situated in the recessed cylinder-head of an internal-combustion engine including a high tension ignition system and cable, comprising two interengaging separable portions of insulating material, a conductor carried within each portion, an electrical contact to connect the two conductors electrically together when the two portions are in engagement with one another, means for electrically connecting the conductor in one portion to the core of the cable and means for electrically connecting the conductor on the other portion to the sparking plug electrode.

11. An electrical coupling for the sparking plug of an internal-combustion engine, of the kind in which the sparking plug is situated in the bottom of a recess in a cylinder-head and including a high tension ignition system and cable, comprising a conductor-carrying portion fixed to the cylinder-head at the top of the recess and having its conductor in electrical engagement with the core of the cable, a second and separate conductor-carrying portion adapted to engage mechanically and electrically with the first said portion and having a contact electrically connected to its conductor and adapted to engage electrically with the sparking plug electrode, means for enclosing the region of the electrical contact between the two portions in a watertight chamber and means for enclosing the region of the contact between the second conductor-carrying portion and the sparking plug electrode also within a watertight chamber.

12. An electrical coupling for the sparking plug of a sleeve-valve, internal-combustion engine, of the kind in which the sparking plug is situated in the combustion-chamber at the bottom of the recess and including a high tension ignition system and cable, comprising a moulding of synthetic resin having a conductor connected to a resilient contact carried by the moulding and adapted to be brought into engagement with the sparking plug electrode, means for electrically connecting the said conductor to the core of the cable at or near the top of the cylinder-head recess, and spring-pressed means for retaining the said moulding in position within the recess whereby it constitutes a bridging connection between the core of the cable and the sparking plug electrode.

13. An electrical coupling according to claim 3 wherein the said contact-carrier comprises two limbs, each carrying a conductor and projecting downwardly into the recess and each carrying a contact whereby the cable is electrically connected to two sparking plugs situated in the recess.

14. A sleeve-valve, radial-cylinder, internal-combustion engine for aircraft including a high tension ignition system and cable having a sparking plug situated in a recess in each cylinder-head, an electrical coupling in each cylinder-head adapted to afford a bridging electrical connection between the core of the cable and the sparking plug electrode, means comprising a part of said coupling capable of being withdrawn out of the recess to disconnect the electrical coupling, a streamlined cowl surrounding the engine and having apertures registering with the said recessed cylinder-heads whereby the detachable portions aforesaid may be withdrawn through the cowl, and a closure for each of the said apertures in the cowl.

15. An electrical coupling for a sparking plug situated in the recessed cyliner-head of an internal-combustion engine, comprising a socket portion fixed to the cylinder-head and carrying an electrical conductor, a contact-carrying portion adapted to mechanically engage the socket portion by two correspondingly-formed ledges on the socket portion and on the contact-carrier, and having a conductor adapted to electrically engage the conductor in the socket portion at a point intermediate the two ledges, and a pair of rubber packing rings, one at each ledge, to seal the region of said electrical contact in a watertight compartment.

ALFRED HUBERT ROY FEDDEN.